(12) United States Patent
Golsch

(10) Patent No.: US 10,730,479 B2
(45) Date of Patent: Aug. 4, 2020

(54) TAMPER SECURITY SYSTEMS AND METHODS FOR VEHICLES

(71) Applicants: DENSO International America, Inc., Southfield, MI (US); DENSO CORPORATION, Kariya, Aichi-pref. (JP)

(72) Inventor: Kyle Golsch, Pontiac, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/359,140

(22) Filed: Mar. 20, 2019

(65) Prior Publication Data

US 2019/0299931 A1   Oct. 3, 2019

Related U.S. Application Data

(60) Provisional application No. 62/648,991, filed on Mar. 28, 2018.

(51) Int. Cl.
*B60R 25/24* (2013.01)
*B60R 25/102* (2013.01)
(Continued)

(52) U.S. Cl.
CPC .......... *B60R 25/24* (2013.01); *B60R 25/102* (2013.01); *G01S 13/765* (2013.01);
(Continued)

(58) Field of Classification Search
CPC ........ B60R 2325/101; B60R 2325/105; B60R 2325/205; B60R 25/102; B60R 25/1025;
(Continued)

(56) References Cited

U.S. PATENT DOCUMENTS 8,930,045 B2   1/2015   Oman et al.
9,123,244 B2   9/2015   Daman et al.
(Continued)

FOREIGN PATENT DOCUMENTS

BR   102014017465 A2   2/2016
CN   104574593 A   4/2015
(Continued)

*Primary Examiner* — Yong Hang Jiang
(74) *Attorney, Agent, or Firm* — Harness, Dickey & Pierce, P.L.C.

(57) ABSTRACT

A passive entry/passive start (PEPS) system includes a communication gateway configured to transmit a ping signal based on at least one of a predetermined period and a predetermined transmission power level. The PEPS system includes at least one sensor configured to receive the ping signal and measure a physical characteristic of the ping signal. The PEPS system includes a central module configured to receive the measured physical characteristic of the ping signal, determine a lower threshold and an upper threshold associated with the at least one sensor, and compare the measured physical characteristic of the ping signal to the lower threshold and the upper threshold. In response to determining that the measured physical characteristic is less than the lower threshold and greater than the upper threshold, the central module is further configured to notify a portable device that the at least one sensor has been tampered with.

20 Claims, 10 Drawing Sheets

(51) Int. Cl.
*G01S 13/76* (2006.01)
*G07C 9/00* (2020.01)
*G07C 5/08* (2006.01)
*H04K 3/00* (2006.01)

(52) U.S. Cl.
CPC ....... *G07C 5/0808* (2013.01); *G07C 9/00309* (2013.01); *B60R 25/1025* (2013.01); *B60R 2325/101* (2013.01); *B60R 2325/105* (2013.01); *B60R 2325/205* (2013.01); *G07C 2209/63* (2013.01); *H04K 3/00* (2013.01)

(58) Field of Classification Search
CPC .......... B60R 25/24; G01S 11/02; G01S 11/06; G01S 13/765; G01S 5/14; G07C 2209/63; G07C 5/0808; G07C 9/00309; H04K 2203/22; H04K 3/00; H04K 3/22
USPC ...................................................... 340/5.61
See application file for complete search history.

(56) References Cited

U.S. PATENT DOCUMENTS

| | | | |
|---|---|---|---|
| 9,553,694 | B1 | 1/2017 | Elangovan et al. |
| 9,688,247 | B1 | 6/2017 | Jayaraman et al. |
| 9,794,753 | B1 | 10/2017 | Stitt et al. |
| 9,824,556 | B2 * | 11/2017 | Zacchio .............. G08B 29/046 |
| 9,894,492 | B1 | 2/2018 | Elangovan et al. |
| 10,002,479 | B2 | 6/2018 | Oz et al. |
| 2006/0025897 | A1 * | 2/2006 | Shostak ............... B60C 23/005 701/1 |
| 2007/0200688 | A1 | 8/2007 | Tang et al. |
| 2007/0268138 | A1 * | 11/2007 | Chung ................. G01S 5/0018 340/572.1 |
| 2007/0279226 | A1 * | 12/2007 | Whitesmith ....... G08B 13/1427 340/572.1 |
| 2011/0215921 | A1 | 9/2011 | Ben Ayed et al. |
| 2012/0032834 | A1 * | 2/2012 | Weeks ................... G01S 7/003 342/118 |
| 2012/0045058 | A1 | 2/2012 | Weghaus |
| 2013/0214732 | A1 | 8/2013 | Nowottnick |
| 2014/0104048 | A1 * | 4/2014 | De Kock ........... G08B 13/1654 340/429 |
| 2014/0152091 | A1 | 6/2014 | Muller et al. |
| 2014/0188348 | A1 | 7/2014 | Gautama et al. |
| 2014/0240091 | A1 | 8/2014 | Talty et al. |
| 2014/0266654 | A1 * | 9/2014 | Parker ..................... B60R 25/00 340/426.25 |
| 2014/0274013 | A1 | 9/2014 | Santavicca |
| 2014/0330449 | A1 | 11/2014 | Oman et al. |
| 2015/0006115 | A1 * | 1/2015 | Svoboda ................. G01D 3/08 702/190 |
| 2015/0148989 | A1 | 5/2015 | Cooper et al. |
| 2015/0161832 | A1 | 6/2015 | Esselink et al. |
| 2015/0161834 | A1 | 6/2015 | Spahl et al. |
| 2015/0310681 | A1 | 10/2015 | Avery et al. |
| 2015/0356797 | A1 | 12/2015 | McBride et al. |
| 2016/0050563 | A1 | 2/2016 | Bronk |
| 2016/0063786 | A1 | 3/2016 | Lewis et al. |
| 2016/0087485 | A1 | 3/2016 | Maeda et al. |
| 2016/0150407 | A1 | 5/2016 | Michaud et al. |
| 2017/0018128 | A1 | 1/2017 | Berezin et al. |
| 2017/0062938 | A1 | 3/2017 | Cheng et al. |
| 2017/0104589 | A1 | 4/2017 | Lambert et al. |
| 2017/0132533 | A1 | 5/2017 | Darnell et al. |
| 2017/0236351 | A1 | 8/2017 | Menard et al. |
| 2017/0303080 | A1 | 10/2017 | Stitt et al. |
| 2017/0303090 | A1 | 10/2017 | Stitt et al. |
| 2017/0309098 | A1 | 10/2017 | Watters et al. |
| 2017/0330402 | A1 | 11/2017 | Menard et al. |
| 2018/0029560 | A1 | 2/2018 | Mohaupt et al. |
| 2018/0099643 | A1 | 4/2018 | Golsch et al. |
| 2018/0103414 | A1 | 4/2018 | Golsch |
| 2018/0126952 | A1 | 5/2018 | Niemiec |
| 2018/0154865 | A1 | 6/2018 | Bianchi, III et al. |
| 2018/0269565 | A1 | 9/2018 | Guthrie et al. |

FOREIGN PATENT DOCUMENTS

| | | | |
|---|---|---|---|
| DE | 102011076350 A1 * | 11/2012 | ............ H04W 12/12 |
| EP | 2800068 A2 | 11/2014 | |
| FR | 3026212 A1 | 3/2016 | |
| WO | WO-2015177298 A1 | 11/2015 | |
| WO | WO-16156682 A1 | 10/2016 | |
| WO | WO-2017/181035 A1 | 10/2017 | |
| WO | WO-2017/181050 A1 | 10/2017 | |
| WO | WO-18040641 A1 | 3/2018 | |

* cited by examiner

TAMPER SECURITY SYSTEMS AND METHODS FOR VEHICLES

CROSS-REFERENCE TO RELATED APPLICATION

This application claims the benefit of U.S. Provisional Application No. 62/648,991, filed on Mar. 28, 2018. The entire disclosure of the above application is incorporated herein by reference.

FIELD

The present disclosure relates to tamper security systems and methods for vehicles and, more particularly, to tamper security systems and methods using sensors relating to passive entry/passive start systems.

BACKGROUND

This section provides background information related to the present disclosure which is not necessarily prior art.

Traditionally, a passive entry/passive start (PEPS) system allows anyone in possession of a key fob that has been previously paired with a vehicle's central PEPS electronic control unit (ECU) to access the vehicle by simply grabbing the door handle and to start the vehicle with a push of a button. In response to a button push, the central PEPS ECU authenticates the key fob to determine if the key fob is authorized to access the vehicle and uses the signal strength indicated by a plurality of vehicle antennas to estimate the location of the Key Fob. If the Key Fob can be authenticated and is located within an authorizing zone, the vehicle's function is made available to the user (i.e., doors are unlocked or vehicle is started).

SUMMARY

This section provides a general summary of the disclosure, and is not a comprehensive disclosure of its full scope or all of its features.

A passive entry/passive start (PEPS) system includes a communication gateway in a vehicle configured to transmit a ping signal based on at least one of a predetermined period and a predetermined transmission power level. The PEPS system includes at least one sensor configured to receive the ping signal and measure a physical characteristic of the ping signal. The PEPS system includes a central module in the vehicle configured to receive the measured physical characteristic of the ping signal through a vehicle interface, determine a lower threshold and an upper threshold associated with the at least one sensor, and compare the measured physical characteristic of the ping signal to the lower threshold and the upper threshold. In response to determining that at least one of the measured physical characteristic is less than the lower threshold and the measured physical characteristic is greater than the upper threshold, the central module is further configured to notify a portable device that the at least one sensor has been tampered with.

A method includes transmitting a ping signal with a communication gateway in a vehicle based on at least one of a predetermined period and a predetermined transmission power level. The method includes receiving the ping signal with at least one sensor and measuring a physical characteristic of the ping signal. The method includes receiving the measured physical characteristic of the ping signal with a central module in the vehicle through a vehicle interface. The method includes determining, with the central module, a lower threshold and an upper threshold associated with the at least one sensor. The method includes comparing, with the central module, the measured physical characteristic of the ping signal to the lower threshold and the upper threshold. The method includes notifying a portable device that the at least one sensor has been tampered with in response to determining, with the central module, that at least one of the measured physical characteristic is less than the lower threshold and the measured physical characteristic is greater than the upper threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure applies to vehicle systems with keyless systems, generally referred to as PEPS systems or keyless entry and keyless go systems. The present disclosure relates to a PEPS system using a wireless communication protocol, such as, for example, the Bluetooth Low Energy (BLE) communication protocol, for communication between a vehicle and a BLE enabled user device, such as a smartphone or a wearable device. While the present disclosure includes examples using the BLE communication protocol, other wireless communication protocols, such as Wi-Fi, Wi-Fi direct, ultra-wide band (UWB), and/or impulse radio (IR) UWB, can be also be used in accordance with the present disclosure. In general, a PEPS system is a type of localization system. The present disclosure is directed to systems, method, and architecture that securely implement a localization system targeting PEPS applications that use a sensor network configured to measure signal characteristics of a signal received at each of the sensors. In this way, the present disclosure provides a secure PEPS system that can determine if one of the sensors in the sensor network has been tampered with. The present disclosure provides a PEPS system that allows access to vehicle features for an authorized user of the vehicle by verifying that a wireless device is located within an authorizing zone.

It is desirable to allow users to use their wireless devices, such as smartphones and other devices, such as wearable devices, as a vehicle key. In addition, long range distancing features are also becoming critical for convenience, such as passive welcome lighting, distance bounding on remote parking applications, and so on. Such systems and advantages are not achievable with traditional PEPS systems because each vehicle manufacturer and PEPS system supplier traditionally implement proprietary closed systems using radio frequencies that are not used by ubiquitous devices, such as smartphones.

The systems, methods, and architecture of the present disclosure include a PEPS system having a communication gateway that transmits a beacon at a predetermined period and at varying transmission power levels. A plurality of sensors receive the beacon and measure a received signal strength indication (RSSI) of the beacon at each of the sensors. A central module determines whether the measured RSSI at each of the sensors falls within a predetermined probability curve. If the measured RSSI at each of the sensors does not fall within the predetermined probability curve, the central module may notify a user device indicating that the PEPS system has been tampered with. The plurality of sensors can also measure or determine other characteristics of the beacon, such as the angle of arrival (Ao), the time of arrival, the time difference of arrival, and/or round trip time of flight information.

Figure 1:
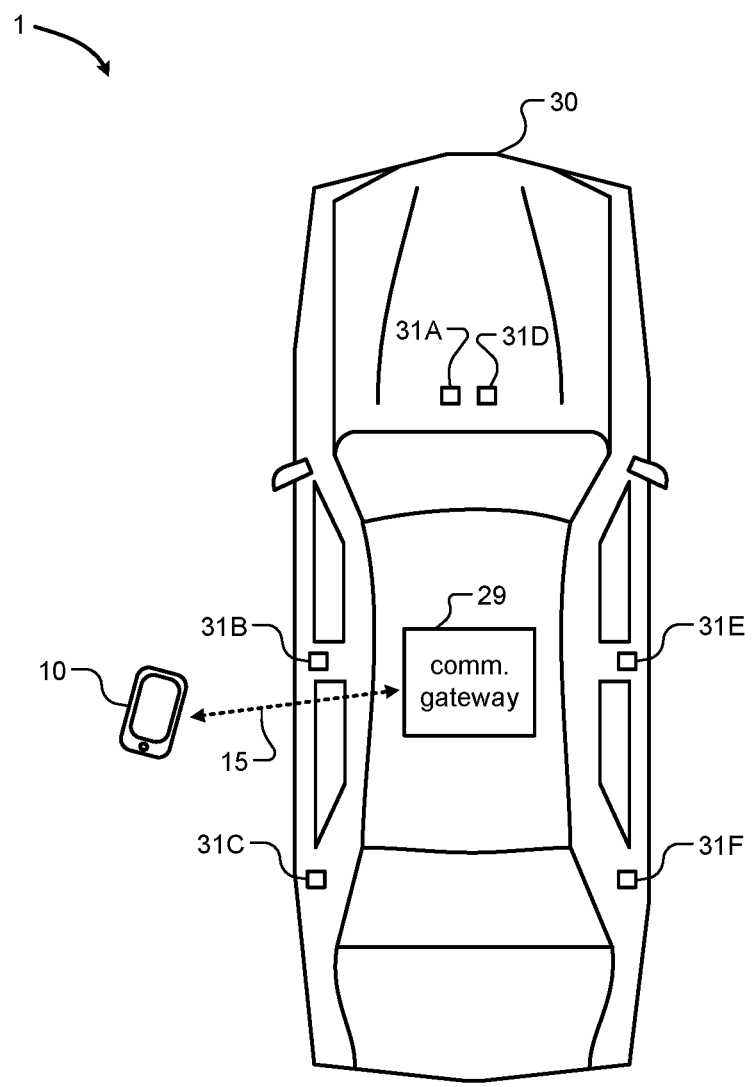
FIG. 1 illustrates a subject vehicle with a PEPS system according to the present disclosure.
Figure 2:
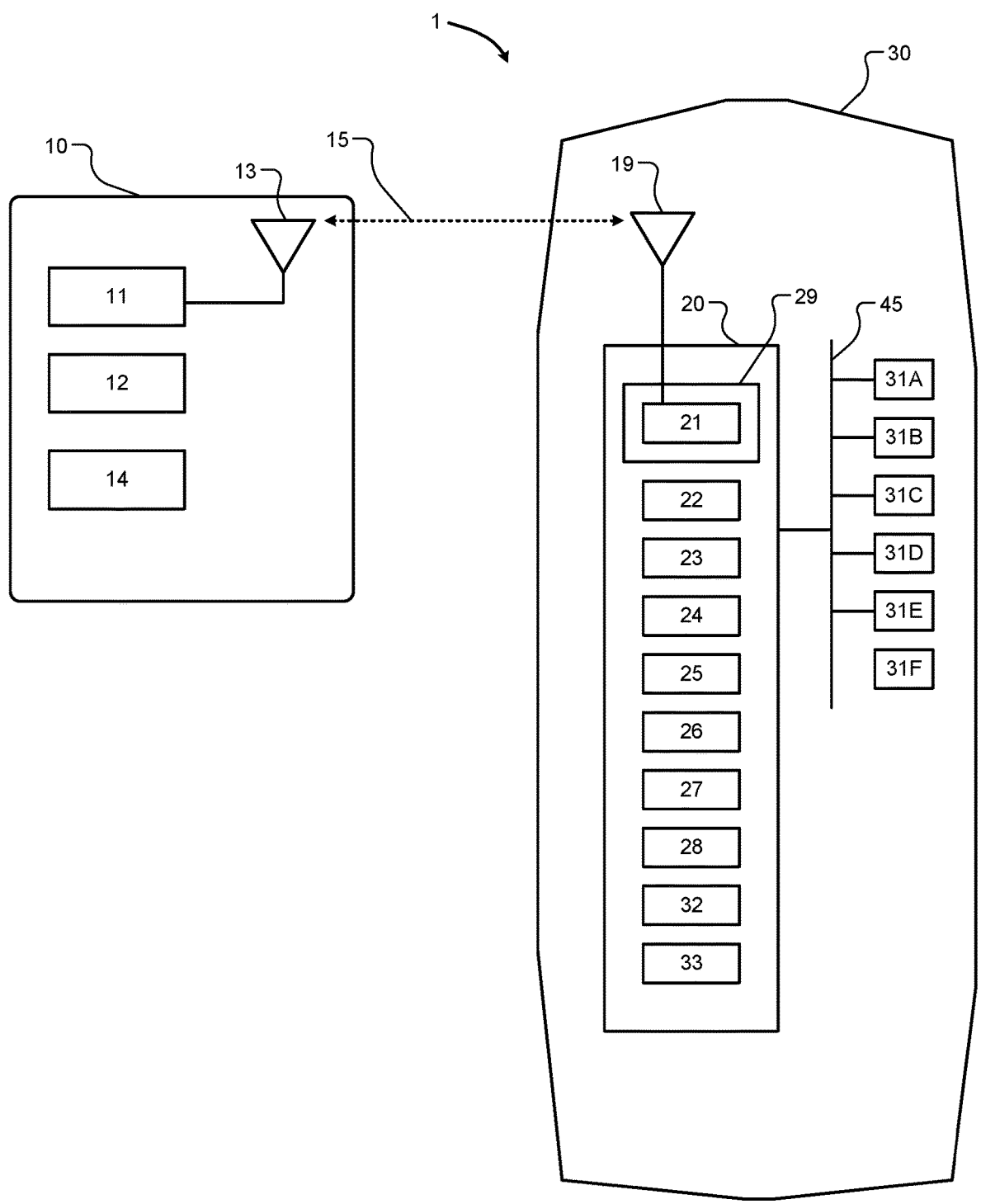
FIG. 2 illustrates a block diagram for a PEPS system according to the present disclosure.

With reference to FIGS. 1 and 2, a PEPS system 1, which may also be referred to as a localization system, is provided within a vehicle 30 and includes a communication gateway 29 and a plurality of sensors 31A-31F, referred to collectively as sensors 31. As shown in FIG. 1, the sensors 31 may be located external to the vehicle 30. Alternatively, the sensors 31 may be located internal to the vehicle 30. The PEPS system 1 includes a central module 20. The central module 20 includes one or more vehicle modules that are distributed throughout the vehicle 30 and are able to communicate with each other through, for example, a vehicle interface 45. In addition, some of the vehicle modules may be integrated into a single ECU or are able to communicate with each other using the vehicle interface 45. The vehicle interface 45, for example, may include a controller area network (CAN) bus for communication between main modules and/or lower data rate communication such as local interconnect network (LIN) for communication between the plurality of sensors 31A-31F. The vehicle interface 45 may also include a clock extension peripheral interface (CXPI) bus. Additionally or alternatively, the vehicle interface 45 may include a combination of CAN bus, LIN, and CXPI bus communication interfaces. The structure of the sensors 31 are discussed in further detail below with reference to FIG. 3.

The central module 20 may include, for example, the communication gateway 29 that includes a BLE chipset 21 connected to an antenna 19. As shown in FIG. 2, the antenna 19 may be located in the vehicle 30. Alternatively, the antenna 19 may be located within the central module 20. Alternatively, the antenna 19 may be located outside of the vehicle 30. The central module 20 may also include a link authentication module 22 that authenticates a portable device 10 for communication via a secure communication link 15. The secure communication link 15 can be a BLE communication link. Alternatively, the secure communication link 15 can be a Wi-Fi, Wi-Fi direct, UWB, or IR-UWB communication link. The central module 20 may also include a data management layer 23 for push data. The central module 20 may also include a connection information distribution module 24. The central module 20 may also include a timing control module 25. The central module 20 may also include a telematics module 26, such as a global positioning system (GPS) module and/or other navigation or location modules. The central module 20 may also include a PEPS module 27. The central module 20 may also include a body control module 28. The central module 20 may also include a localization module 32. The localization module 32 may determine a location of the portable device 10 based on two-way ranging performed by the sensors 31, as described in U.S. patent application Ser. No. 15/730,265, filed on Oct. 11, 2017, and published as U.S. Pub. No. 2018/0099643 on Apr. 12, 2018, which is incorporated herein by reference. The central module 20 may also include a security filtering module 33.

As shown in FIGS. 1 and 2, the portable device 10 may communicate with the communication gateway 29 of the vehicle 30 via the secure communication link 15. Without limitation, the portable device 10 may be any Bluetooth enabled communication device such as a smartphone, smartwatch, wearable electronic device, key fob, tablet device, or other device associated with a user of the vehicle 30, such as an owner, driver, passenger of the vehicle 30, and/or a technician for the vehicle 30. As noted above, the portable device 10 can also be enabled for communication with other wireless communication protocols, such as Wi-Fi, Wi-Fi direct, UWB, and/or IR-UWB. The portable device 10 may include a BLE chipset 11 connected to an antenna 13. The portable device 10 may also include an application software 12 stored in a computer-readable storage module or device. The portable device 10 may also optionally include a GPS module 14 or other device location service.

The portable device 10 and the communication gateway 29 may establish the secure communication link 15, as a Bluetooth communication link, as provided for and defined by the Bluetooth specification. For example, the secure communication link 15 between the portable device 10 and the communication gateway 29 may be a BLE communication link. As noted above, the secure communication link 15 can alternatively be established using other wireless communication protocols, such as Wi-Fi, Wi-Fi direct, UWB, and/or IR-UWB. The PEPS system 1 may be configured to provide additional authentication of the secure communication link 15 with the portable device. For example, the communication gateway 29 may communicate with the link authentication module 22 to authenticate the portable device 10 and establish the secure communication link 15. For example, the link authentication module 22 may be configured to implement challenge-response authentication. In such case, timing information about the communication between the communication gateway 29 and the portable device 10 is sent to the timing control module 25, which communicates with the sensors 31 through the vehicle interface 45, as described below. Further, the communication gateway 29 may communicate information about communication channels and channel switching parameters to the connection information distribution module 24. The connection information distribution module 24 is configured to communicate with each of the sensors 31 using the vehicle interface 45 and to provide the sensors 31 with communication information necessary for the sensors 31 to find and then follow, or eavesdrop on, the secure communication link 15 once the sensors 31 are synchronized with the communication gateway 29. While FIGS. 1 and 2 illustrate the PEPS system 1 with six sensors 31A-31F, any number of sensors may be used. For example, the PEPS system may include seven, eight, nine, ten, eleven, twelve, or more sensors. In this way, while the present disclosure provides an example utilizing six sensors, additional or fewer sensors may be used in accordance with the present disclosure.

Figure 3:
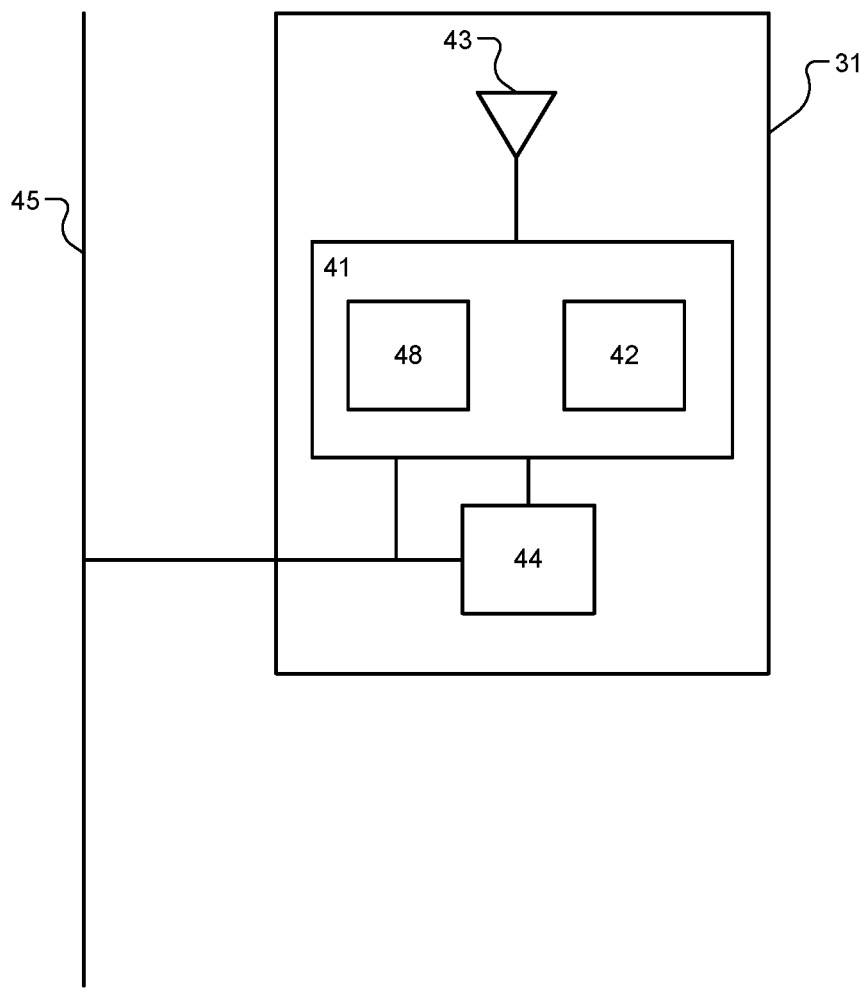
FIG. 3 illustrates a block diagram for a sensor of a PEPS system according to the present disclosure.

With reference to FIG. 3, each of the sensors 31 includes a BLE chipset 41 connected to an antenna 43. As shown in FIG. 3, the antenna 43 may be located internal to the sensors 31. Alternatively, the antenna 43 may be located external to the sensors 31. The sensors 31 receive BLE Signals using the antenna 43 and, specifically, receive BLE physical layer messages using a BLE physical layer (PHY) controller 48. The sensors 31 are capable of observing BLE physical layer messages and taking measurements of the physical properties of the associated signals, including, for example, the RSSI using a channel map that is produced by a channel map reconstruction module 42. Additionally or alternatively, the sensors 31 may determine other measurements of the physical properties of the associated signals, including, for example, data related to the angle of arrival (AoA), time of arrival, and/or round trip time of flight of the associated signals. Additionally or alternatively, the sensors 31 may communicate with each other and/or communicate with the communication gateway 29 via the vehicle interface 45 to determine time difference of arrival, time of arrival, angle of arrival, and/or round trip time of flight data for signals received by multiple sensors. The sensors 31 receive timing information and channel map information from the communication gateway 29 via the vehicle interface 45. A timing synchronization module 44 is configured to accurately measure the reception times of messages on the vehicle interface 45 and pass the timing information to the BLE chipset 41. The BLE chipset 41 is configured to take the channel map information and the timing signals and to tune the PHY controller 48 to a specific channel at a specific time and observe all physical layer messages and data that conform to the Bluetooth physical layer specification, which includes the normal data rates proposed or adopted, for example, in the Bluetooth Specification version 5.0. The data, timestamps, and measured signal strength are reported by the BLE chipset 41 to the communication gateway 29, or other vehicle modules of the vehicle 30 via the vehicle interface 45.

Figure 4:
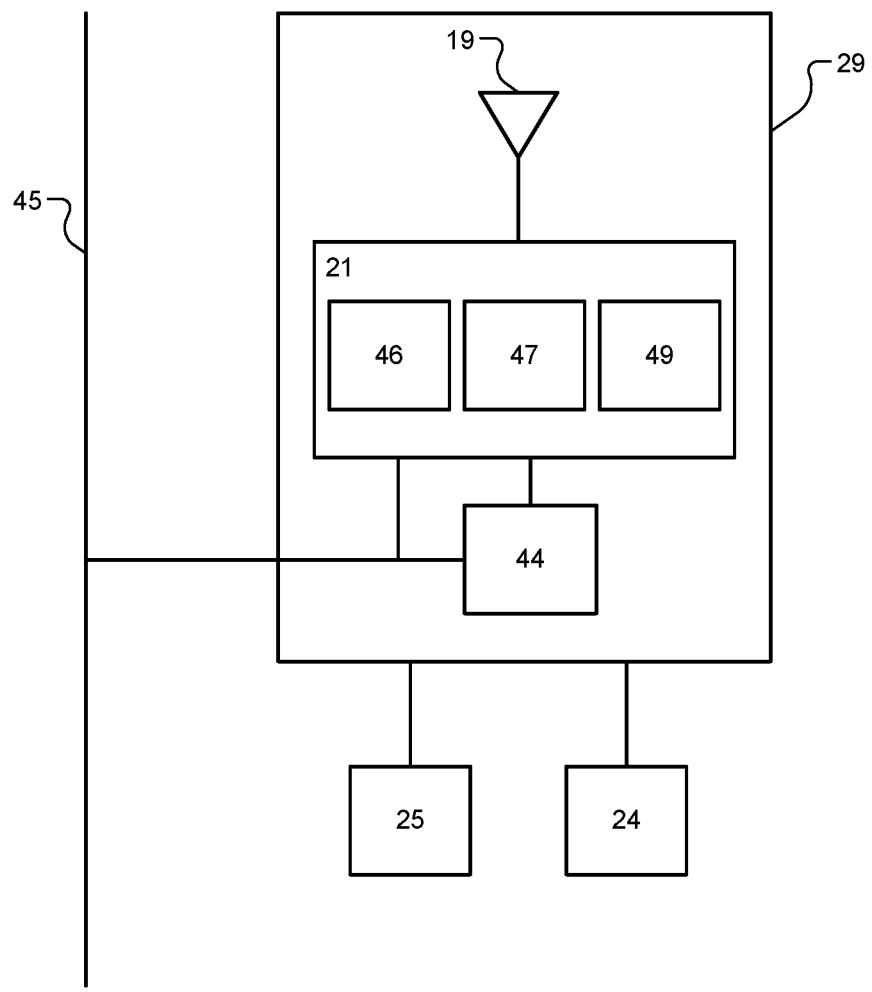
FIG. 4 illustrates a communication gateway of a PEPS system according to the present disclosure.

With reference to FIG. 4, the communication gateway 29 includes the BLE chipset 21 connected to the antenna 19 to transmit and/or receive BLE Signals. The BLE chipset 21 implements a Bluetooth protocol stack 46 that is, for example, compliant with the BLE specification, including, for example, version 5 of the BLE specification. The BLE chipset 21 also includes an application 47 implemented by application code stored in a computer-readable medium, such as a storage module. The application 47 may include modifications outside of the Bluetooth specification to enable the BLE chipset 21 to inspect timestamped data transmitted and received by the BLE chipset 21, regardless of the validity of the data. For example, the application 47 enables the BLE chipset 21 to compare transmitted and received data against expectations. The communication gateway 29 is configured to transmit the actual transmitted and received data to vehicle systems of the vehicle 30 via the vehicle interface 45. Alternatively, the communication gateway 29 may be configured to receive the data from each of the sensors 31 via the vehicle interface 45. The application 47 may be further configured to enable the BLE chipset 41 to confirm that each of the sensors 31 has received the correct data at the correct time, as described in further detail below.

With continued reference to FIG. 4, the communication gateway 29 is further configured to provide information about ongoing connections and timing signals necessary for each of the sensors 31 to find the connection being maintained by the communication gateway 29 with the portable device 10, for example, and to subsequently follow the connection. A Bluetooth protocol stack 46 is configured to provide the channel map, access identifier, next channel, and the time to the next channel to the application 47. The Bluetooth protocol stack 46 is configured to output timing signals for the timestamps of transmission and reception events to the application 47 and/or a digital PIN output of the BLE chipset 41. The communication gateway 29 also includes the timing synchronization module 44. The timing synchronization module 44 is configured to accept the timing signals and works in conjunction with the vehicle interface 45 to create accurate time stamps of connection information messages and other communications. The BLE chipset 41 includes a beacon 49 that transmits a ping 34, as described in further detail below.

Figure 5:
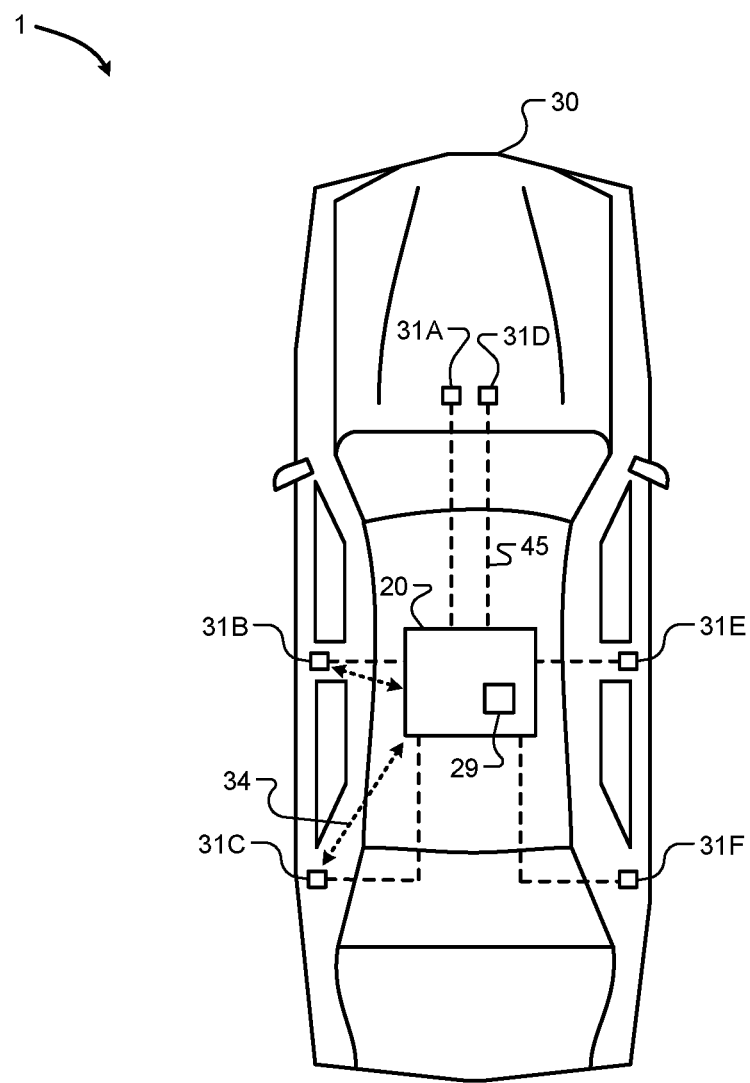
FIG. 5 illustrates a subject vehicle with sensors according to the present disclosure.
Figure 6:
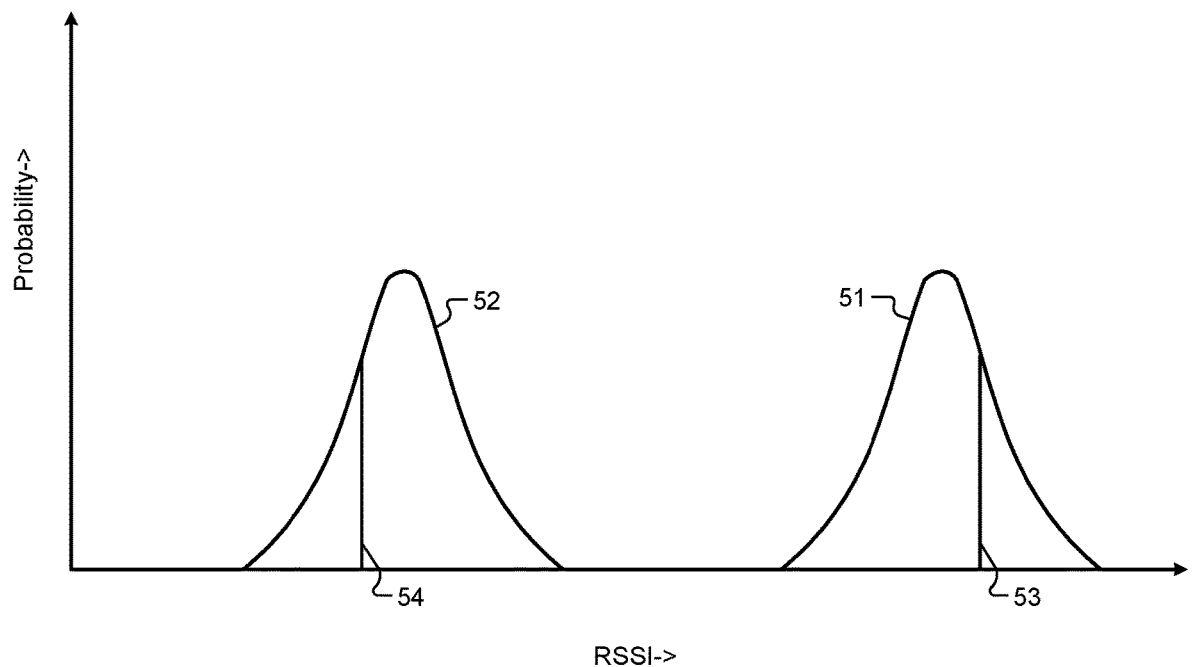
FIG. 6 illustrates a received signal strength indication diagram for sensors according to the present disclosure.

With reference to FIGS. 5 and 6, the sensors 31 are connected to the communication gateway 29 via the vehicle interface 45, as represented by dashed lines in FIG. 5. The communication gateway 29 may transmit the ping 34 via antenna 19, as represented by dotted lines in FIG. 5. For example, the ping 34 may be transmitted using radio frequency (RF) signals, such as a low frequency (LF) signal, a high frequency (HF) signal, or a ultra-high frequency (UHF) signal (i.e., BLE, Bluetooth, Wi-Fi, GPS, and so on). The ping 34 may be transmitted at a predetermined period. Additionally or alternatively, the ping 34 may be transmitted at varying transmission power levels. For example, the predetermined period may range between one second and sixty seconds, and the varying transmission power levels may range between one milliwatt and one hundred milliwatts. The communication gateway 29 determines the power level to transmit the ping 34 at and/or when to transmit the ping 34. For example, a first ping may be transmitted at four milliwatts. A second ping may be transmitted twenty seconds after the first ping was transmitted and the second ping may be transmitted at one milliwatt. A third ping may be transmitted six seconds after the second ping was transmitted and the third ping may be transmitted at eight milliwatts, and so on. Although the ping 34 is discussed as being transmitted using RF signals, the ping 34 may be transmitted through a wire, such as the vehicle interface 45.

Each of the sensors 31 receives the ping 34 via antenna 43. The sensors 31 are capable of taking measurements of the physical properties associated with the ping 34, including, for example, the RSSI using a channel map that is produced by the channel map reconstruction module 42. Additionally or alternatively, the sensors 31 may determine other measurements of the physical properties associated with the ping 34, including, for example, time of flight of the ping 34. For example, the sensors 31 may determine the time of flight of the ping 34 by measuring a period between when the communication gateway 29 transmitted the ping 34 and when each of the sensors 31 received the ping 34. Each of the sensors 31 measures the RSSI of the ping 34 received at the respective sensor. Each of the sensors 31 sends the respective measured RSSI of the ping 34 to the central module 20 via the vehicle interface 45.

The central module 20 determines a probability curve for each of the sensors 31 based on the transmission power level of the ping 34 and the known locations of each of the sensors 31. The probability curve for each of the sensors 31 is an expected RSSI of the ping 34 for a respective sensor. The expected RSSI received by each of the sensors 31 may be determined based on empirical data derived from one or more parameters, such as distance between a sensor and a beacon, or a transmission power level of a ping. In FIG. 6, the horizontal axis represents the RSSI of the ping 34 by each of the sensors 31. In FIG. 6, the vertical axis represents the probability of receiving the RSSI of the ping 34 by each of the sensors 31.

For exemplary purposes, FIG. 6 illustrates an expected probability curve 51 for sensor 31B and an expected probability curve 52 for sensor 31C of the ping 34 transmitted at four milliwatts. The RSSI of the ping 34 for each of the sensors 31 may increase, shifting an expected probability curve to the right as the distance between the sensor and the beacon decreases and vice versa. For example, the RSSI of the ping 34 at sensor 31B is greater than the RSSI of the ping 34 at sensor 31C because sensor 31B is closer to the beacon 49 than sensor 31C is. Additionally or alternatively, the RSSI of the ping 34 for each of the sensors 31 may increase, shifting an expected probability curve to the right as the transmission power level of the ping 34 increases and vice versa. While the expected probability curve 51 for sensor 31B and the expected probability curve 52 for sensor 31C of the ping 34 transmitted at four milliwatts is shown and discussed, the central module 20 determines the expected probability curve for each of the sensors 31 for each of the possible transmission power levels of the ping 34.

The central module 20 receives the measured RSSI of the ping 34 from each of the sensors 31. The central module 20 compares the measured RSSI with the expected probability curve for each of the sensors 31 respectively. The central module 20 determines that a sensor is working properly (i.e., sensor has not been tampered with) when the measured RSSI falls within the expected probability curve for each of the sensors 31 respectively. For example, the central module 20 receives a measured RSSI 53 for sensor 31B and a measured RSSI 54 for sensor 31C. The central module 20 compares the measured RSSI 53 with the expected probability curve 51 and the measured RSSI 54 with the expected probability curve 52. The central module 20 determines that sensor 31B and sensor 31C are working properly because the measured RSSI 53 and the measured RSSI 54 are within the expected probability curve 51 and the expected probability curve 52 respectively. While sensor 31B and sensor 31C are discussed and shown as working properly, the central module 20 may determine that each of the sensors 31 is working properly when the measured RSSI falls within the expected probability curve for each of the sensors 31 respectively.

Traditional BLE PEPS systems allow anyone in possession of a portable device that has been previously paired with a vehicle's central PEPS ECU to access the vehicle by simply grabbing the door handle and to start the vehicle with a push of a button. In response to a button push, the central PEPS ECU authenticates the portable device to determine if the portable device is authorized to access the vehicle and uses the signal strength indicated by a plurality of sensors to estimate the location of the portable device. If the portable device can be authenticated and is located within an authorizing zone, the vehicle's function is made available to the user (i.e., doors are unlocked or vehicle is started).

If the portable device is located outside the authorizing zone, the vehicle's function is not made available to the user. For example, the portable device may be located outside the authorizing zone when the user walks away from the vehicle and into the user's home. A thief wanting to gain access to the vehicle's function may consider stealing the portable device, but this may be challenging considering that the portable device is located within the user's home. In contrast, the thief may tamper with one of the plurality of sensors by bringing it closer to the portable device so that the portable device is now located within the authorizing zone.

Figure 7:
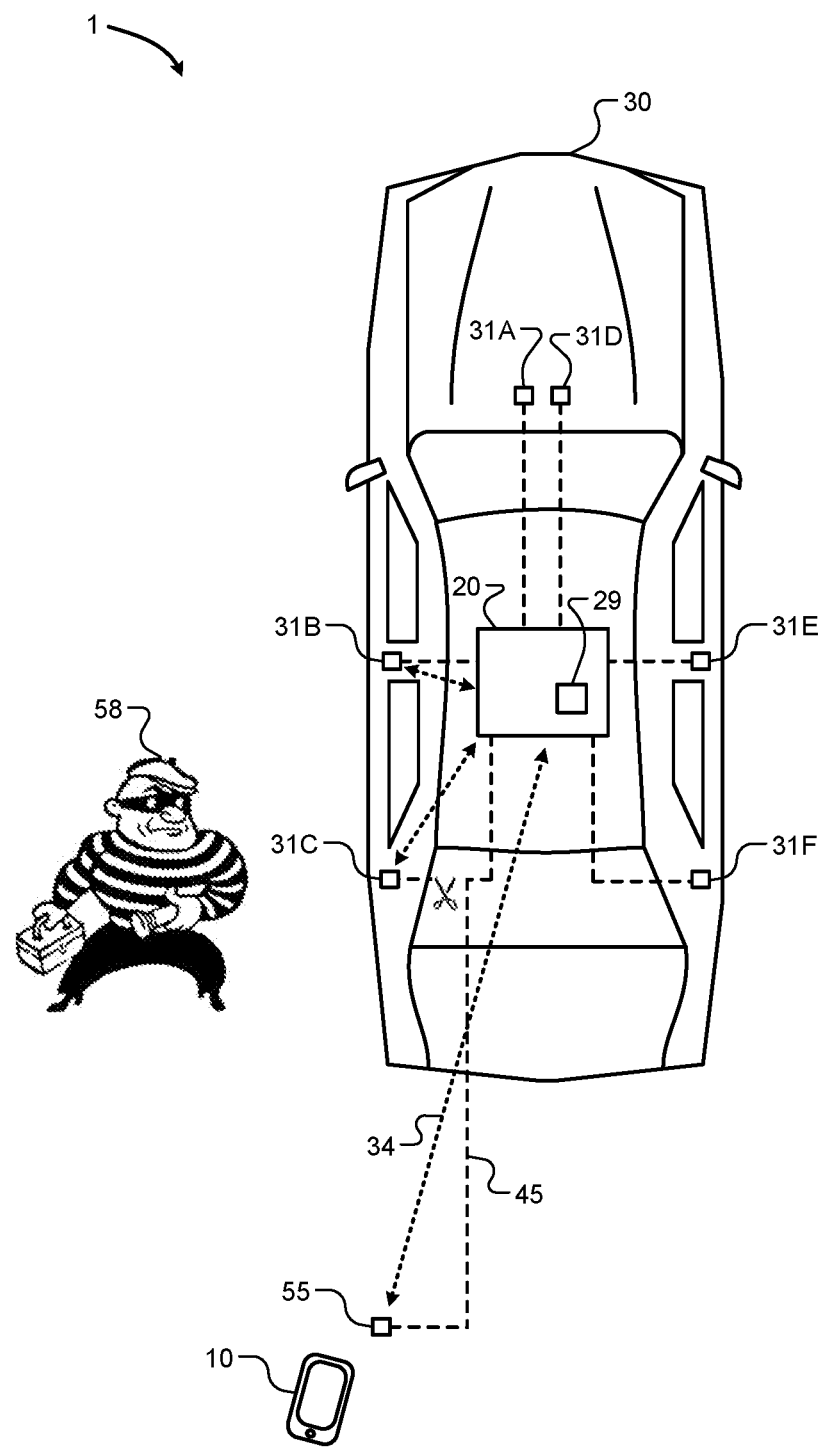
FIG. 7 illustrates a subject vehicle with a sensor that has been tampered with according to the present disclosure.
Figure 8:
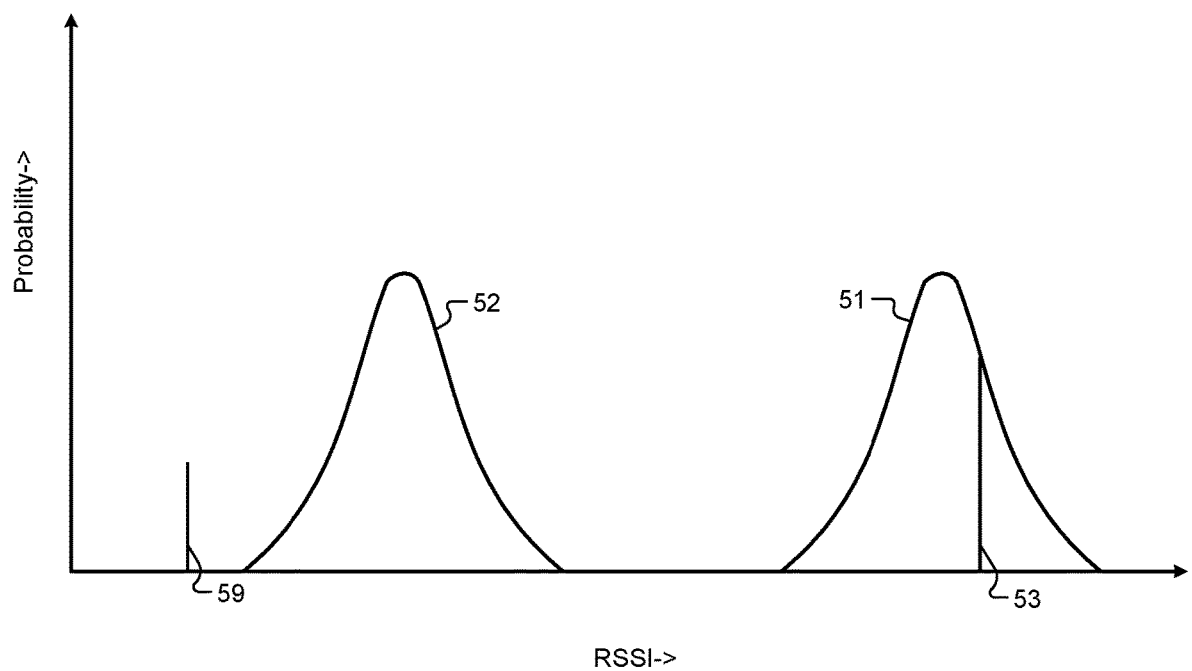
FIG. 8 illustrates a received signal strength indication diagram for a sensor that has been tampered with according to the present disclosure.

The PEPS system 1, of the present disclosure, determines and notifies the user that one of the plurality of sensors may have been tampered with. With reference to FIGS. 7 and 8, a thief 58 may tamper with sensor 31C. For example, the thief 58 may tamper with sensor 31C by cutting the vehicle interface 45 located between sensor 31C and the communication gateway 29. The vehicle interface 45 is represented by dashed lines in FIG. 7. The thief 58 may then connect sensor 55 to the vehicle interface 45 that was previously cut. The thief 58 may try to position sensor 55 as close as possible to the portable device 10 so that the portable device 10 is now located within the authorizing zone. With the portable device 10 located in the authorizing zone, the vehicle's function is made available to the thief 58 (i.e., doors are unlocked or vehicle is started). Although the thief 58 is shown and discussed as tampering with sensor 31C, the thief 58 may tamper with any of the other sensors 31.

The communication gateway 29 may transmit the ping 34 via antenna 19, as represented by dotted lines in FIG. 7. Each of the sensors 31 and sensor 55 receive the ping 34 via antenna 43. Each of the sensors 31 and sensor 55 may measure the RSSI of the ping 34 received at the respective sensor. Each of the sensors 31 and sensor 55 send the respective measured RSSI of the ping 34 to the central module 20 via the vehicle interface 45.

The central module 20 determines the expected probability curve for each of the sensors 31 based on the transmission power level of the ping 34 and the known locations of each of the sensors 31. FIG. 8, for example, illustrates the expected probability curve 51 for sensor 31B and the expected probability curve 52 for sensor 31C of the ping 34 transmitted at four milliwatts. In FIG. 8, the horizontal axis represents the RSSI of the ping 34 by each of the sensors 31. In FIG. 8, the vertical axis represents the probability of receiving the RSSI of the ping 34 by each of the sensors 31.

The central module 20 receives the measured RSSI of the ping 34 from each of the sensors 31 and sensor 55 that is connected to the vehicle interface 45. The central module 20 compares the measured RSSI with the expected probability curve for each of the sensors 31 respectively. The central module 20 determines that a sensor is not working properly (i.e., sensor has been tampered with) when the measured RSSI for each of the sensors 31 and sensor 55 is outside the expected probability curve for each of the sensors 31. For example, the central module 20 receives the measured RSSI 53 for sensor 31B and a measured RSSI 59 for sensor 55. Although sensor 31C measures the RSSI of the ping 34 received by sensor 31C, sensor 31C may not be able to send the measured RSSI to the central module 20 because the vehicle interface 45 between sensor 31C and the central module 20 may have been cut by the thief 58. Instead, the central module 20 receives the measured RSSI 59 from sensor 55 because the thief 58 has replaced sensor 31C with sensor 55.

The central module 20 compares the measured RSSI 53 with the expected probability curve 51 and the measured RSSI 59 with the expected probability curve 52. The central module 20 determines that sensor 31B is working properly because the measured RSSI 53 falls within the expected probability curve 51. The central module 20 determines that sensor 31C has been tampered with because the measured RSSI 59 does not fall within the expected probability curve 52 for sensor 31C.

Figure 9:
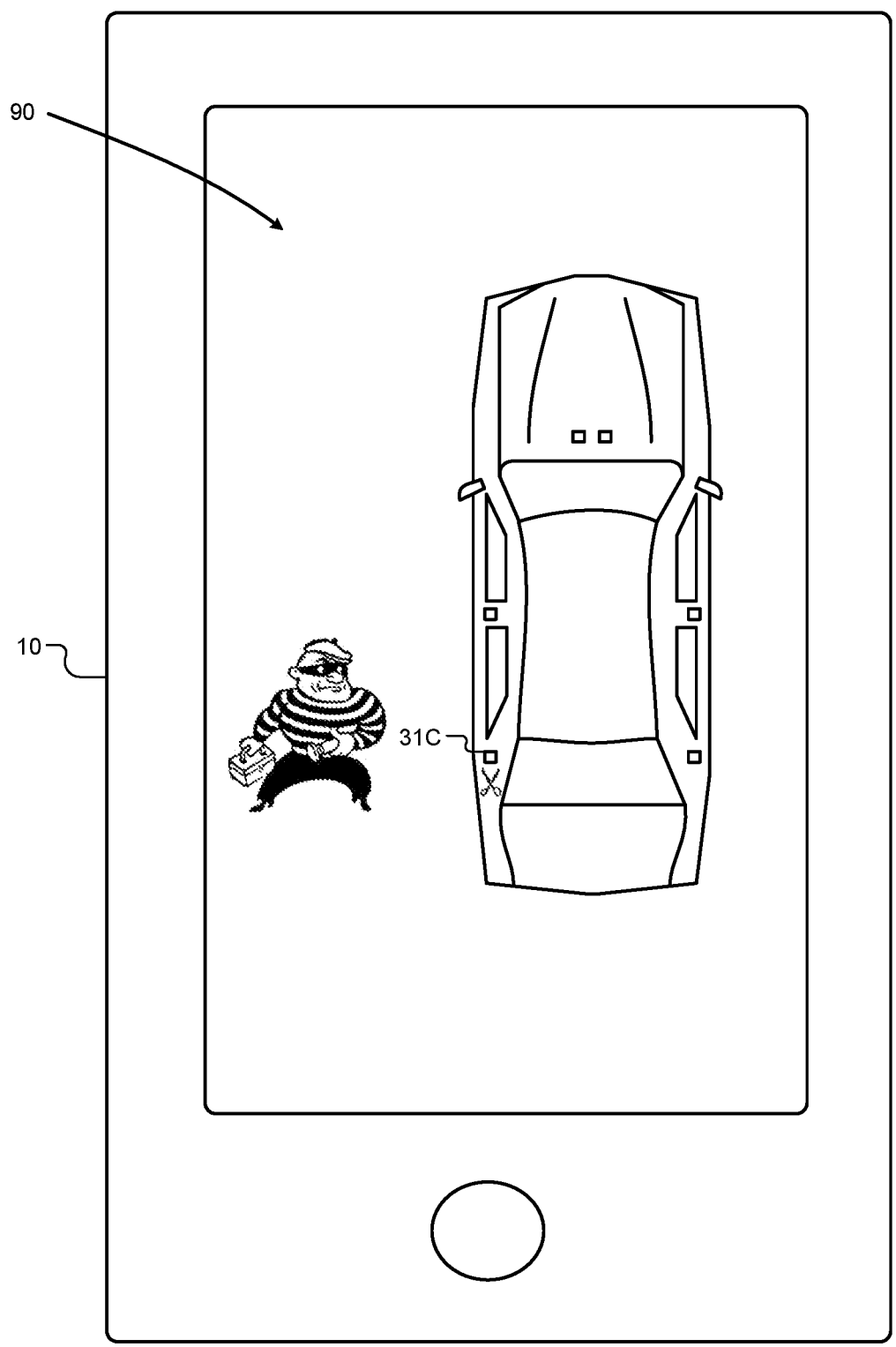
FIG. 9 illustrates a screenshot of an alert sent to a portable device according to the present disclosure.

With reference to FIG. 9, the portable device 10, such as a smartphone or tablet device, may include a user interface, such as a user interface of an application running on the smartphone or tablet device that alerts the user that one of the sensors 31 may have been tampered with. For example, in response to the central module 20 determining that sensor 31C has been tampered with because the measured RSSI 59 is not within the expected probability curve 52 for sensor 31C, the central module 20 may send an alert to the portable device 10. The alert may be displayed, for example, on the portable device 10 using a graphical interface 90 depicting which sensor has been tampered with and a thief gaining access to a user's vehicle.

Figure 10:
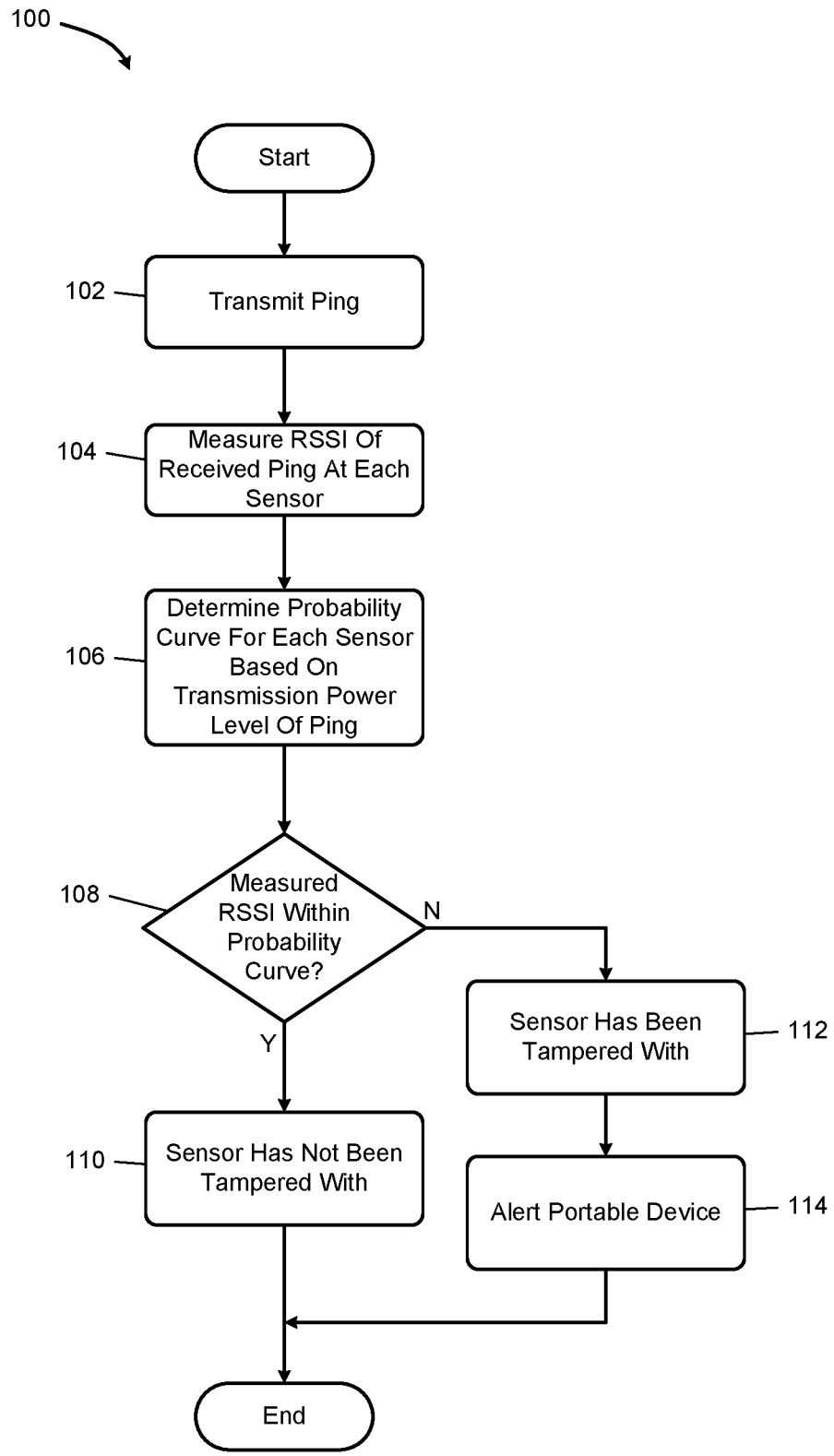
FIG. 10 illustrates a flowchart depicting an example method of determining that a sensor has been tampered with according to the present disclosure.

With reference to FIG. 10, a flowchart depicting an example method of determining that a sensor has been tampered with according to the present disclosure is presented. A control algorithm 100 begins with 102 where the communication gateway 29 transmits the ping 34 via antenna 19. At 104, each of the sensors 31 and sensor 55 receive the ping 34 via antenna 43. Each of the sensors 31 and sensor 55 measure the RSSI of the ping received at the respective sensor. Each of the sensors 31 and sensor 55 send the respective measured RSSI of the ping 34 to the central module 20 via the vehicle interface 45.

At 106, the central module 20 determines the expected probability curve for each of the sensors 31 based on the transmission power level of the ping 34 and the known locations of each of the sensors 31. At 108, the central module 20 compares the measured RSSI with the expected probability curve for each of the sensors 31 respectively. The central module 20 determines whether the measured RSSI for each of the sensors 31 and sensor 55 falls within the expected probability curve for each of the sensors 31. If true, the control algorithm 100 continues with 110. If 108 is false, the control algorithm 100 transfers to 112.

At 110, the central module 20 determines that a sensor has not been tampered with. At 112, the central module 20 determines that a sensor has been tampered with. At 114, the central module 20 sends an alert to the portable device 10. For example, the alert may be displayed on the portable device 10 using the graphical interface 90 depicting which sensor has been tampered with and a thief gaining access to a user's vehicle. While the control algorithm 100 is shown and discussed as ending, the example of FIG. 10 may be illustrative of one control loop and the control algorithm 100 may return to 102.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A passive entry/passive start (PEPS) system comprising:
   a communication gateway in a vehicle configured to transmit a ping signal based on at least one of a predetermined period and a predetermined transmission power level;
   at least one sensor configured to receive the ping signal and measure a physical characteristic of the ping signal;
   a central module in the vehicle configured to receive the measured physical characteristic of the ping signal through a vehicle interface, determine a lower threshold and an upper threshold associated with the at least one sensor, and compare the measured physical characteristic of the ping signal to the lower threshold and the upper threshold; and
   in response to determining that at least one of the measured physical characteristic is less than the lower threshold and the measured physical characteristic is greater than the upper threshold, the central module is further configured to notify a portable device that the at least one sensor has been tampered with.

2. The PEPS system of claim 1, wherein the measured physical characteristic of the ping signal includes at least one of a received signal strength indication (RSSI), a time of flight, a time difference of arrival, and a time of arrival.

3. The PEPS system of claim 2, wherein the ping signal is transmitted using radio frequency signals including at least one of a low frequency signal, a high frequency signal, and an ultra-high frequency signal.

4. The PEPS system of claim 3, wherein the ultra-high frequency signal includes a Bluetooth Low Energy (BLE) signal.

5. The PEPS system of claim 2, further configured to receive a location of the portable device from a localization module and to perform a vehicle function including at least one of unlocking a door of the vehicle, unlocking a trunk of the vehicle, and allowing the vehicle to be started based on the location of the portable device.

6. The PEPS system of claim 2, wherein the central module determines the lower threshold and the upper threshold based on a probability curve associated with the at least one sensor, wherein the probability curve is determined based on an expected RSSI of the ping signal by the at least one sensor.

7. The PEPS system of claim 6, wherein the expected RSSI of the ping signal increases in response to at least one of a distance between the at least one sensor and the communication gateway decreases, and the predetermined transmission power level increases.

8. The PEPS system of claim 6, wherein the expected RSSI of the ping signal decreases in response to at least one of a distance between the at least one sensor and the communication gateway increases, and the predetermined transmission power level decreases.

9. The PEPS system of claim 1, wherein notifying the portable device that the at least one sensor has been tampered with includes the central module transmitting an alert to a graphical interface on the portable device.

10. The PEPS system of claim 1, wherein the ping signal is transmitted using the vehicle interface, the vehicle interface is a wired connection between the communication gateway and the at least one sensor.

11. A method comprising:
    transmitting a ping signal with a communication gateway in a vehicle based on at least one of a predetermined period and a predetermined transmission power level;

receiving the ping signal with at least one sensor and measuring a physical characteristic of the ping signal;

receiving the measured physical characteristic of the ping signal with a central module in the vehicle through a vehicle interface;

determining, with the central module, a lower threshold and an upper threshold associated with the at least one sensor;

comparing, with the central module, the measured physical characteristic of the ping signal to the lower threshold and the upper threshold; and notifying a portable device that the at least one sensor has been tampered with in response to determining, with the central module, that at least one of the measured physical characteristic is less than the lower threshold and the measured physical characteristic is greater than the upper threshold.

12. The method of claim 11, wherein measuring the physical characteristic of the ping signal includes at least one of a received signal strength indication (RSSI), a time of flight, a time difference of arrival, and a time of arrival.

13. The method of claim 12, wherein transmitting the ping signal using radio frequency signals includes at least one of a low frequency signal, a high frequency signal, and an ultra-high frequency signal.

14. The method of claim 13, wherein the ultra-high frequency signal includes a Bluetooth Low Energy (BLE) signal.

15. The method of claim 12, further comprising:
receiving a location of the portable device from a localization module; and
performing a vehicle function including at least one of unlocking a door of the vehicle, unlocking a trunk of the vehicle, and allowing the vehicle to be started based on the location of the portable device.

16. The method of claim 12, wherein determining the lower threshold and the upper threshold is based on a probability curve associated with the at least one sensor, wherein determining the probability curve is based on an expected RSSI of the ping signal by the at least one sensor.

17. The method of claim 16, wherein the expected RSSI of the ping signal increases in response to at least one of a distance between the at least one sensor and the communication gateway decreases, and the predetermined transmission power level increases.

18. The method of claim 16, wherein the expected RSSI of the ping signal decreases in response to at least one of a distance between the at least one sensor and the communication gateway increases, and the predetermined transmission power level decreases.

19. The method of claim 11, wherein notifying the portable device that the at least one sensor has been tampered with includes the central module transmitting an alert to a graphical interface on the portable device.

20. The method of claim 11, wherein transmitting the ping signal using the vehicle interface, the vehicle interface is a wired connection between the communication gateway and the at least one sensor.

* * * * *